US012735026B2

(12) United States Patent
Lee et al.

(10) Patent No.: US 12,735,026 B2
(45) Date of Patent: Sep. 15, 2026

(54) ADVANCED DRIVER ASSISTANCE SYSTEM AND VEHICLE

(71) Applicants: Hyundai Motor Company, Seoul (KR); Kia Corporation, Seoul (KR)

(72) Inventors: Jung Hyun Lee, Seoul (KR); Sam Yong Kim, Hwaseong-Si (KR); Donghoon Koo, Seoul (KR)

(73) Assignees: Hyundai Motor Company;, Seoul (KR); Kia Corporation, Seoul (KR)

( * ) Notice: Subject to any disclaimer, the term of this patent is extended or adjusted under 35 U.S.C. 154(b) by 360 days.

(21) Appl. No.: 18/200,396

(22) Filed: May 22, 2023

(65) Prior Publication Data

US 2024/0083415 A1 Mar. 14, 2024

(30) Foreign Application Priority Data

Sep. 13, 2022 (KR) ........................ 10-2022-0114661

(51) Int. Cl.
*B60W 30/08* (2012.01)
*G06T 7/246* (2017.01)
(Continued)

(52) U.S. Cl.
CPC ............. *B60W 30/08* (2013.01); *G06T 7/248* (2017.01); *G06T 7/70* (2017.01); *G06V 10/757* (2022.01); *G06V 20/46* (2022.01); *G06V 20/56* (2022.01)

(58) Field of Classification Search
CPC ............... B60W 30/08; B60W 30/095; B60W 30/0956; B60W 2420/403;
(Continued)

(56) References Cited

U.S. PATENT DOCUMENTS 6,535,114 B1 3/2003 Suzuki et al.
7,266,220 B2 * 9/2007 Sato ....................... G08G 1/167 382/104

(Continued)

FOREIGN PATENT DOCUMENTS

DE 102020213147 A1 * 4/2022 ............ B60W 50/14
JP 2001-266160 A 9/2001

(Continued)

OTHER PUBLICATIONS

A Robust Road Vanishing Point Detection Adapted to the Real-world Driving Scenes (https://doi.org/10.3390/s21062133).

(Continued)

*Primary Examiner* — John Villecco
(74) *Attorney, Agent, or Firm* — MORGAN, LEWIS & BOCKIUS LLP

(57) ABSTRACT

An advanced driver assistance system (ADAS) includes a communicator configured to communicate with a camera; and a processor configured to: receive a first image and a second image obtained by the camera, obtain a plurality of first feature points based on the received first image, obtain a plurality of second feature points based on the received second image, obtain a plurality of first and second feature points matching each other among the plurality of first feature points and the plurality of second feature points, obtain an optical flow and a vanishing point based on the plurality of first and second feature points matching each other, recognize a pose of the camera based on the optical flow and the vanishing point, and correct a distance to an object in the second image based on the recognized pose of the camera.

14 Claims, 16 Drawing Sheets

(51) Int. Cl.

| | |
|---|---|
| ***G06T 7/70*** | (2017.01) |
| ***G06V 10/75*** | (2022.01) |
| ***G06V 20/40*** | (2022.01) |
| ***G06V 20/56*** | (2022.01) |

(58) Field of Classification Search

CPC ....... B60W 2554/20; B60W 2554/402; B60W 2554/4023; B60W 2554/4029; B60W 2554/441; G06T 7/248; G06T 7/70; G06V 20/46; G06V 20/50; G06V 20/56; G06V 20/58; G06V 10/82

See application file for complete search history.

(56) References Cited

U.S. PATENT DOCUMENTS

| | | | | |
|---|---|---|---|---|
| 10,019,637 | B2 | 7/2018 | Chen et al. | |
| 10,380,433 | B2 * | 8/2019 | Guarneri | G06T 7/215 |
| 10,424,081 | B2 * | 9/2019 | Jaehnisch | G06T 7/80 |
| 10,694,175 | B2 * | 6/2020 | Bovyrin | H04N 17/002 |
| 12,002,235 | B2 * | 6/2024 | Thong | G06T 7/13 |
| 12,307,771 | B2 * | 5/2025 | Li | G06V 10/40 |
| 2015/0329048 | A1 * | 11/2015 | Wang | G06T 7/80 348/148 |
| 2017/0061623 | A1 * | 3/2017 | Jaehnisch | G06T 7/80 |
| 2018/0060679 | A1 * | 3/2018 | Park | G08G 1/16 |
| 2018/0082133 | A1 * | 3/2018 | Guarneri | G06T 7/246 |
| 2018/0324415 | A1 * | 11/2018 | Bovyrin | G06V 20/582 |
| 2019/0102910 | A1 * | 4/2019 | Kaneko | G06T 7/13 |
| 2022/0254164 | A1 * | 8/2022 | Sakai | G06T 7/20 |
| 2024/0054656 | A1 * | 2/2024 | Higashibara | G06V 10/141 |
| 2024/0103525 | A1 * | 3/2024 | Lee | G06T 7/60 |
| 2024/0212194 | A1 * | 6/2024 | Jeon | G06T 7/73 |
| 2024/0355126 | A1 * | 10/2024 | Higashibara | G06V 20/56 |

FOREIGN PATENT DOCUMENTS

| | | | | | |
|---|---|---|---|---|---|
| JP | 2008-225784 | A | | 9/2008 | |
| JP | 2015-214282 | A | | 12/2015 | |
| JP | 2016-527574 | A | | 9/2016 | |
| JP | 2018155709 | A | * | 10/2018 | G06T 7/85 |
| JP | 6849403 | B2 | | 3/2021 | |
| KR | 10-2017-0114523 | A | | 10/2017 | |
| KR | 10-2022-0033875 | A | | 3/2022 | |
| KR | 20220033875 | A | * | 3/2022 | G06V 20/588 |
| WO | WO2014203743 | A1 | | 12/2014 | |
| WO | WO-2023130842 | A1 | * | 7/2023 | G06T 7/246 |

OTHER PUBLICATIONS

Cuong Nguyen Khae et al, “A Robust Road Vanishing Point Detection Adapted to the Real-world Driving Scenes” , Sensors 2021, 21,2133, pp. 1-15 (https://doi.org/10.3390/s21062133).

* cited by examiner

ADVANCED DRIVER ASSISTANCE SYSTEM AND VEHICLE

CROSS-REFERENCE TO RELATED APPLICATION

The present application claims priority to Korean Patent Application No. 10-2022-0114661, filed on Sep. 13, 2022, the entire contents of which is incorporated herein for all purposes by this reference.

BACKGROUND OF THE PRESENT DISCLOSURE

Field of the Present Disclosure

The present disclosure relates to an advanced driver assistance system (ADAS) and a vehicle recognizing a pose of a camera using an image.

Description of Related Art

Cameras are essentially mounted in a vehicle provided with an advanced driver assistance system (ADAS) for autonomous driving, collision warning, and the like.

Such vehicles recognize an object through cameras, obtain information related to the object, and obtain an object's location using the obtained information.

When a vehicle recognizes an object through a camera, a vehicle pose may be changed by topography of an area and an installation pose of the camera may be changed by an external force. In the present instance, an error may occur between an actual distance to the object and a distance measured through image processing.

Vehicles have performed at an automated online calibration (AOC) to correct a distance error caused by a distance difference due to a change in pose of a camera, and a vehicle dynamic compensation (VDC) to compensate for an error of a camera's image due to topography of an area.

A relative pose of a vehicle to a road surface is always changed, and a relative pose of a camera mounted on the vehicle is changed as well. Accordingly, a pose of a vehicle has been estimated using a VDC, and a distance error has been compensated through vehicle pose estimation. In the present instance, the change amount in pose is estimated in chronological order, causing accumulation of the distance error.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an advanced driver assistance system (ADAS) and a vehicle which may recognize a pose of a camera using an optical flow and a vanishing point in an image, obtain a distance error between a recognized distance and an actual distance to an object based on the recognized camera pose, and correct a distance to the object based on the obtained distance error.

Additional aspects of the present disclosure will be set forth in part in the description which follows, and in part, will be obvious from the description, or may be learned by practice of the present disclosure.

According to an aspect of the present disclosure, there is provided an advanced driver assistance system (ADAS), including: a communicator configured to communicate with a camera; and a processor configured to: receive a first image and a second image obtained by the camera, obtain a plurality of first feature points based on the received first image, obtain a plurality of second feature points based on the received second image, obtain a plurality of first and second feature points matching each other among the plurality of first feature points and the plurality of second feature points, obtain an optical flow and a vanishing point based on the plurality of first and second feature points matching each other, recognize a pose of the camera based on the optical flow and the vanishing point, and correct a distance to an object in the second image based on the recognized pose of the camera.

According to an aspect of the present disclosure, the second image is obtained consecutively after the first image is obtained.

According to an aspect of the present disclosure, the processor is configured to obtain a plurality of optical flows connecting the plurality of first and second feature points matching each other, and obtain trajectory data of the camera based on the obtained plurality of optical flows.

According to an aspect of the present disclosure, the processor is configured to: generate a plurality of straight lines by connecting and extending the plurality of first and second feature points matching each other, obtain a plurality of cross points where the plurality of straight lines cross, and obtain a point where the plurality of cross points converge, as the vanishing point.

According to an aspect of the present disclosure, the processor is configured to obtain relative pose data of the camera based on location information of the obtained vanishing point.

According to an aspect of the present disclosure, the processor is configured to recognize the pose of the camera based on the relative pose data of the camera and the trajectory data of the camera.

According to an aspect of the present disclosure, the processor is configured to: identify a density of the plurality of cross points, obtain a weight of the relative pose data of the camera and a weight of the trajectory data of the camera based on the identified density, and recognize the pose of the camera based on the obtained weight of the relative pose data of the camera and the obtained weight of the trajectory data of the camera.

According to an aspect of the present disclosure, the processor is configured to: perform a Gaussian fitting for the plurality of cross points, obtain a Gaussian coefficient corresponding to the Gaussian fitting, obtain a reliability determination value based on the obtained Gaussian coefficient, obtain a weight of the relative pose data based on the obtained reliability determination value, and obtain a weight of the trajectory data based on the obtained weight of the relative pose data.

According to an aspect of the present disclosure, the Gaussian coefficient includes a height (a) and a width (c) of a Gaussian graph corresponding to the Gaussian fitting, and the reliability determination value is obtained by dividing the width (c) by the height (a).

According to an aspect of the present disclosure, the processor is configured to: set a reliability of the relative pose data to be higher than a reliability of the trajectory data, based on the reliability determination value being equal to or similar to 0, and set the reliability of the trajectory data to be higher than the reliability of the relative pose data, based on the reliability determination value being equal to or similar to 1.

According to another aspect of the present disclosure, there is provided a vehicle including: a vehicle body; a camera provided on the vehicle body; and a processor configured to recognize an object and a distance to the object based on images obtained by the camera.

According to another aspect of the present disclosure, the processor is configured to: obtain a plurality of first feature points based on a first image among the images, obtain a plurality of second feature points based on a second image among the images, obtain a plurality of first and second feature points matching each other among the plurality of first feature points and the plurality of second feature points, obtain a plurality of optical flows and a vanishing point based on the plurality of first and second feature points matching each other, recognize a pose of the camera based on the plurality of optical flows and the vanishing point, obtain a distance error to an object in the second image based on the recognized pose of the camera, and correct a distance to the object based on the obtained distance error.

According to another aspect of the present disclosure, the vehicle further includes a display. The processor is configured to generate a top view by use of a second image obtained by correcting the distance to the object, and control the display to display the generated top view.

According to another aspect of the present disclosure, the processor is configured to control an autonomous driving and a collision warning based on a second image obtained by correcting the distance to the object.

According to another aspect of the present disclosure, the processor is configured to obtain the plurality of optical flows connecting the plurality of first and second feature points matching each other, and obtain trajectory data of the camera based on the obtained plurality of optical flows.

According to another aspect of the present disclosure, the processor is configured to: generate a plurality of straight lines by connecting and extending the plurality of first and second feature points matching each other, obtain a plurality of cross points where the plurality of straight lines cross, obtain a point where the plurality of cross points converge, as the vanishing point; and obtain relative pose data of the camera based on location information of the obtained vanishing point.

According to another aspect of the present disclosure, the processor is configured to recognize the pose of the camera based on the relative pose data of the camera and the trajectory data of the camera.

According to another aspect of the present disclosure, the processor is configured to: identify a density of the plurality of cross points, obtain a weight of the relative pose data of the camera and a weight of the trajectory data of the camera based on the identified density, and recognize the pose of the camera based on the obtained weight of the relative pose data of the camera and the obtained weight of the trajectory data of the camera.

According to another aspect of the present disclosure, the processor is configured to: perform a Gaussian fitting for the plurality of cross points, obtain a Gaussian coefficient corresponding to the Gaussian fitting, obtain a reliability determination value based on the obtained Gaussian coefficient, obtain a weight of the relative pose data based on the obtained reliability determination value, and obtain a weight of the trajectory data based on the obtained weight of the relative pose data.

According to another aspect of the present disclosure, the Gaussian coefficient includes a height (a) and a width (c) of a Gaussian graph corresponding to the Gaussian fitting, and the reliability determination value is obtained by dividing the width (c) by the height (a).

According to another aspect of the present disclosure, the processor is configured to: set a reliability of the relative pose data to be higher than a reliability of the trajectory data, based on the reliability determination value being equal to or similar to 0, and set the reliability of the trajectory data to be higher than the reliability of the relative pose data, based on the reliability determination value being equal to or similar to 1.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
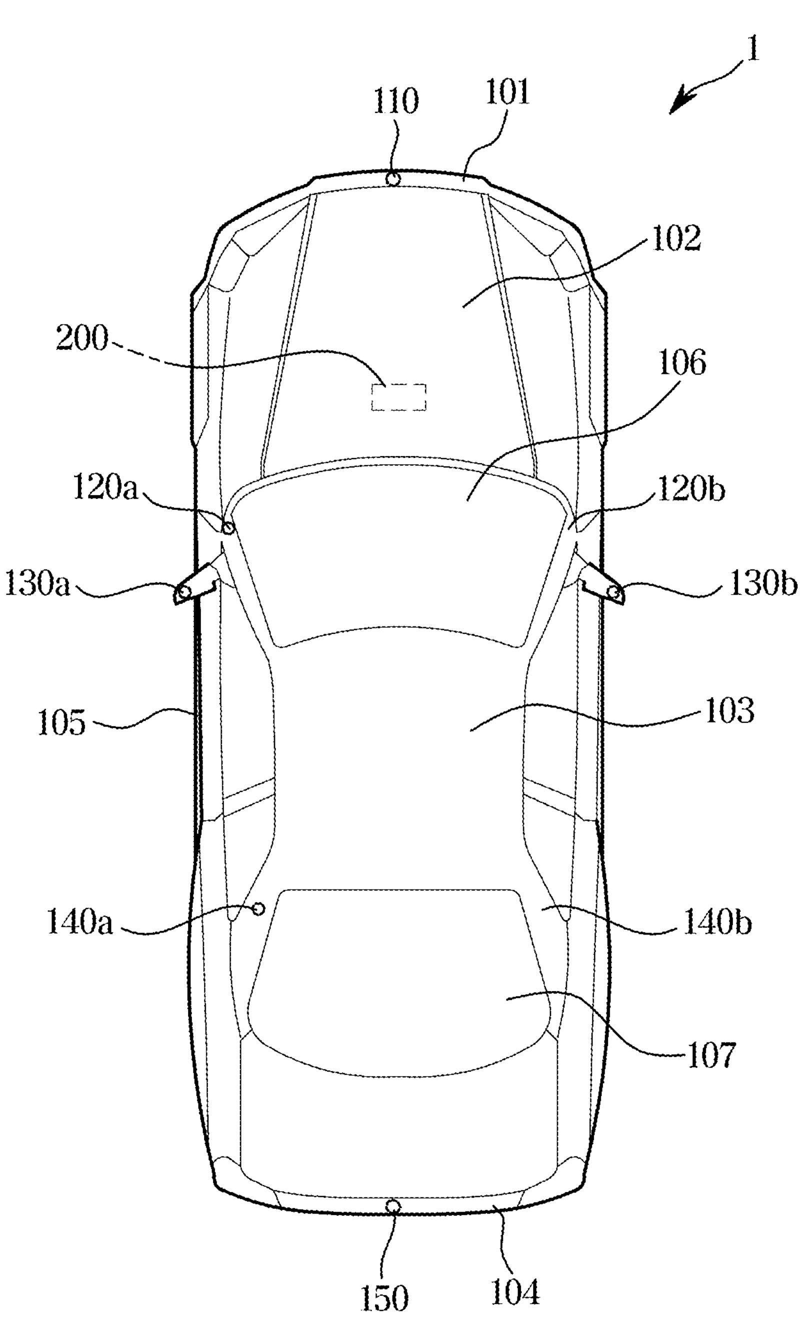
FIG. 1 illustrates an example of an exterior of a vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Like reference numerals throughout the specification denote like elements. Also, the present specification does not describe all the elements according to various exemplary embodiments of the present disclosure, and descriptions well-known in the art to which the present disclosure pertains or overlapped portions are omitted. The terms such as "~part", "~member", "~module", "~device", and the like may refer to at least one process processed by at least one hardware or software. According to various exemplary embodiments of the present disclosure, a plurality of "~parts", "~members", "~modules", "~devices" may be embodied as a single element, or a single of a "~part", "~member", "~module", "~device" may include a plurality of elements.

It will be understood that when an element is referred to as being "connected" to another element, it may be directly or indirectly connected to the other element, wherein the indirect connection includes "connection" via a wireless communication network.

It will be understood that the term "include" when used in the present specification, specifies the presence of stated features, integers, steps, operations, elements, and/or components, but does not preclude the presence or addition of at least one other features, integers, steps, operations, elements, components, and/or groups thereof.

It will be understood that, although the terms first, second, etc. may be used herein to describe various elements, these elements should not be limited by these terms.

It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

Hereinafter, an operation principle and embodiments will be described in detail with reference to the accompanying drawings.

Figure 2:
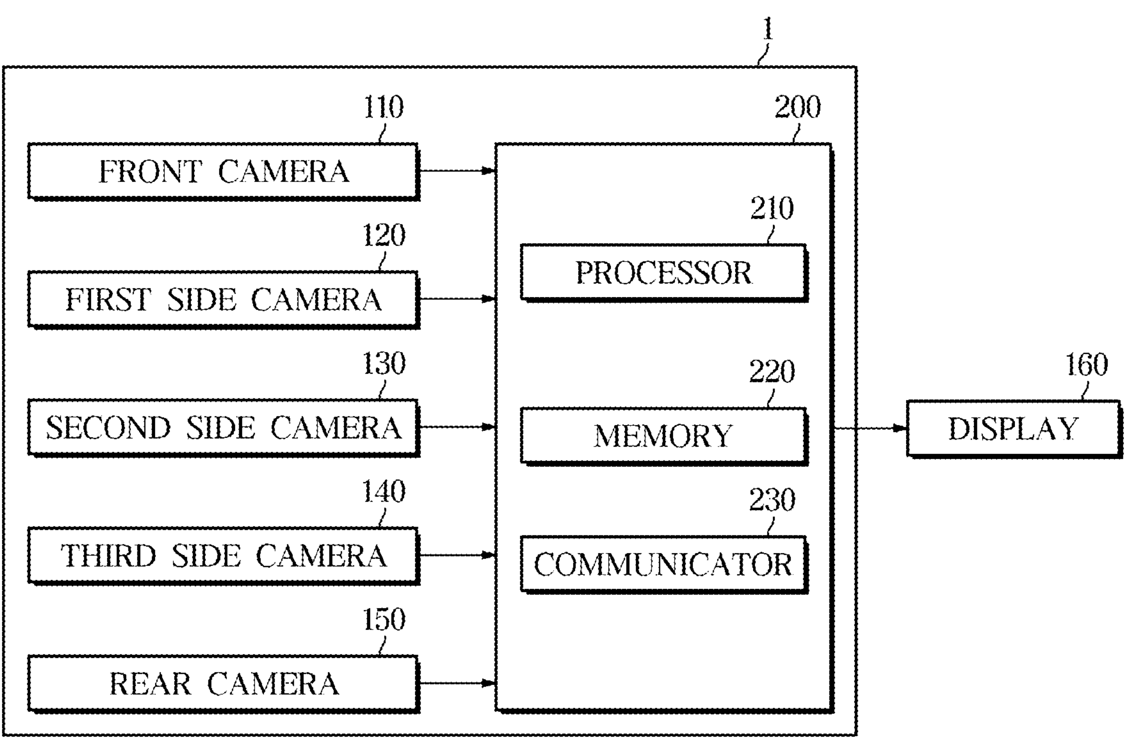
FIG. 2 is a control block diagram illustrating a vehicle according to an exemplary embodiment of the present disclosure.

FIG. 1 illustrates an example of an exterior of a vehicle according to an exemplary embodiment of the present disclosure. FIG. 2 is a control block diagram illustrating a vehicle according to an exemplary embodiment of the present disclosure.

A vehicle 1 includes a body having an exterior and an interior, and a chassis where mechanical devices for driving are mounted as a remaining portion except for the body.

The chassis of the vehicle 1 is a frame for supporting the body of the vehicle 1, and includes a power device, a steering device, and a brake device for applying a driving force, a steering force, and a braking force to the wheels of the vehicle 1, respectively, and further includes a suspension device, a gear box, and the like.

The body of the vehicle 1 includes a front panel 101, a bonnet 102, a roof panel 103, a rear panel 104, a plurality of doors 105, window glasses provided to each of the doors 105 to be configured to be open or closed, a front windshield glass 106 for securing a front view, and a rear windshield glass 107 for securing a rear view.

The body of the vehicle 1 may further include pillars provided on the left and right sides of the front windshield glass 106, on the left and right sides of the rear windshield glass 107 and on edge portions of the window glasses.

For example, the pillars may include A pillars supporting the front windshield glass 106, provided on the left and right sides of the front windshield glass 106, and connected to the roof panel 103, B pillars provided between a front left door and a rear left door and provided between a front right door and a rear right door, and C pillars provided on the left and right sides of the rear windshield glass 107 and on edge portions of the rear left and rear right doors.

The vehicle 1 may further include an advanced driver assistance systems (ADAS, 200) for assisting a driver in operating (driving, braking and steering) the vehicle 1.

For example, the ADAS 200 may detect roads and surroundings (e.g., other vehicles, pedestrians, cyclists, lanes, traffic signs, and the like), and control the vehicle's driving and/or braking and/or steering in response to the detected surroundings. Hereinafter, an object includes any kind of object which may collide with the vehicle 1 in motion, such as another vehicle, cyclists, and the like.

The ADAS 200 may provide a driver with a variety of functions in addition to autonomous driving and collision warning.

For example, the vehicle 1 may provide functions such as a lane departure warning (LDW), a lane keeping assist (LKA), a high beam assist (HBA), an autonomous emergency braking (AEB), a traffic sign recognition (TSR), a smart cruise control (SCC), a blind spot detection (BSD), and the like.

As shown in FIG. 1, the vehicle 1 may include at least one camera. Although not illustrated in FIG. 1, the vehicle 1 may further include at least one of a radar, a laser imaging, detection, and ranging (LiDAR), or an ultrasonic sensor.

The at least one camera may be a full high definition (FHD) for image processing.

The at least one camera may include an include a charge-coupled device (CCD) or complimentary metal-oxide-semiconductor (CMOS) image sensor, and a three-dimensional (3D) space recognition sensor such as a KINECT (RGB-D sensor), Time of Flight (TOF), stereo camera, etc.

The at least one camera may be provided at different positions on the body of the vehicle 1.

For example, the at least one camera may include a front camera 110, first side cameras 120 (120*a* and 120*b*), second side cameras 130 (130*a* and 130*b*), third side cameras 140 (140*a* and 140*b*), and a rear camera 150.

The front camera 110 may be provided on the front windshield glass 106 or front panel of the vehicle 1 to secure a front field of view. The front camera 110 may photograph a front of the vehicle 1 and obtain image data of the front of the vehicle 1.

The front camera 110 may obtain an image of a moving object in front of the vehicle 1 or an image of an object travelling on adjacent lanes within the front lateral field of view.

The image data of the front of the vehicle 1 may include location information related to at least one of other vehicles, pedestrians, cyclists, lanes, curbs, guardrails, street trees, or streetlights.

The first side camera 120 (120*a* and 120*b*) may be provided on the front left and right sides of the vehicle 1 such as the A pillar, B pillar, and the like, of the vehicle 1 to secure the front left and right fields of view. The first side camera 120 may photograph the front left and right sides of the vehicle 1 and obtain image data of the front left and right sides of the vehicle 1.

The second side camera 130 (130*a* and 130*b*) may be provided on side mirrors of the vehicle 1 to secure fields of view toward lower left and right sides of the vehicle 1. The second side camera 130 may photograph the lower left and right sides of the vehicle 1 and obtain image data of the lower left and right sides of the vehicle 1.

The second side camera 130 (130*a* and 130*b*) may also secure fields of view toward the left and right sides of the vehicle 1. The second side camera 130 may photograph the left and right sides of the vehicle 1 and obtain image data of the left and right sides of the vehicle 1.

The third side camera 140 (140*a* and 140*b*) may be provided on rear left and right sides of the vehicle 1, such as the C pillar of the vehicle 1 to secure rear left and right fields of view. The third side camera 140 may photograph the rear left and right sides of the vehicle 1 and obtain image data of the rear left and right sides of the vehicle 1.

The rear camera 150 may be provided on a rear side of the vehicle, such as a rear bumper, and the like, of the vehicle 1 to secure a rear field of view. The rear camera 150 may photograph a rear of the vehicle 1 and obtain image data of the rear of the vehicle 1.

As shown in FIG. 2, the vehicle 1 may further include a display 160.

The display 160 may display an image about the surroundings of the vehicle 1. Here, the image may be obtained by the at least one camera.

The display 160 may display a location of an obstacle around the vehicle 1.

The display 160 may display notification information related to collision warning.

The display 160 may display a top view image. Here, the top view image is also referred to as an around-view image.

The display 160 may display a top view image in which a distance error between a recognized distance and an actual distance to an object in an image is corrected.

The display 160 may further include an image sensor and a system on chip (SOC) for converting analog signals into digital signals, controlling and image processing.

The display 160 may be provided as a cathode ray tube (CRT), a digital light processing (DLP) panel, a plasma display panel (PDP), liquid crystal display (LCD) panel, electro luminescence (EL) panel, electrophoretic display (EPD) panel, electrochromic display (ECD) panel, light-emitting diode (LED) panel, organic LED (OLED) panel, and the like, without being limited thereto.

As shown in FIG. 2, the vehicle 1 may include the ADAS 200.

The ADAS 200 may control autonomous driving in response to an autonomous driving mode, or control an output of collision warning in response to a collision warning mode.

The ADAS 200 may recognize a road environment and control autonomous driving based on the recognized road environment, or predict a likelihood of collision to an obstacle and provide a warning based on a determination that a collision may occur.

The ADAS 200 may communicate with the plurality of cameras, and also communicate with LiDARs or radars.

The ADAS 200 may recognize the road environment, based on image information of the plurality of cameras and location information related to an obstacle detected by the LiDARs, radars or ultrasonic sensors.

The ADAS 200 may obtain images obtained by each of the cameras, and generate a stereoscopic image by considering a geometric relationship among the images of the plurality of cameras.

The ADAS 200 may include a processor 210 processing the image data of the plurality of cameras, and configured for generating steering signals, braking signals, warning signals, and the like.

The ADAS 200 may identify objects in an image based on the image information obtained by the plurality of cameras, compare information related to the identified objects to object information stored in a memory 220, and determine whether the objects in the image are stationary or moving.

The stationary object may include a streetlight, a street tree, a lane, a speed bump (speed hump), traffic lights, and the like. The moving object may include another vehicle, a pedestrian, a cyclist, a bike, and the like.

When the image data of the plurality of cameras is image-processed, the ADAS 200 may recognize a pose of each of the cameras and recognize the road environment based on the recognized pose of each camera. For example, the ADAS 200 may accurately recognize a location of an object.

The ADAS 200 may recognize a pose of the vehicle 1 based on the pose of each camera, which is described in greater detail later.

The memory 220 may store a program and/or data for processing the image data, a program and/or data for processing radar data, and a program and/or data for the processor 210 to generate a braking signal, a steering signal, and/or a warning signal.

The memory 220 may temporarily store the image data received from the plurality of cameras, and temporarily store a processing result of the image data and/or the radar data.

The memory 220 may be implemented with at least one of a volatile memory such as a random access memory (RAM), a non-volatile memory such as a cache, a flash memory, a read only memory (ROM), a programmable read only memory (PROM), an erasable programmable read only memory (EPROM), an electrically erasable programmable read only memory (EEPROM), etc., or a recording media such as a Hard Disk Drive (HDD), or a compact disc read only memory (CD-ROM), without being limited thereto.

The memory 220 and the processor 210 may be integrated into one chip, or provided as separate chips.

The ADAS 200 may further include a communicator 230. The communicator 230 may communicate with the plurality of cameras, the display, the brake device, the suspension device, the steering device, and the like.

The communicator 230 may include at least one constituent component facilitating communication between an external device and the constituent components of the vehicle 1, for example, at least one of a short-range communication module, wireless communication module, or a wired communication module.

The external device may be a remote controller and a user terminal.

The short-range communication module may include a variety of short-range communication modules that transmit and receive signals in a short distance using a wireless communication network, such as a Bluetooth module, infrared communication module, radio frequency identification (RFID) communication module, wireless local access network (WLAN) communication module, near-field communication (NFC) communication module, Zigbee communication module, and the like.

The wired communication module may include various wired communication modules such as a Controller Area Network (CAN) communication module, local area network (LAN) module, wide area network (WAN) module, value added network (VAN) module, or the like, and also include various cable communication modules such as a universal serial bus (USB), high definition multimedia interface (HDMI), digital visual interface (DVI), recommended standard 232 (RS-232), power line communication, plain old telephone service (POTS), or the like.

The wired communication module may further include a Local Interconnect Network (LIN).

The wireless communication module may include wireless communication modules that support a variety of wireless communication methods such as a Global System for Mobile communication (GSM), Code Division Multiple Access (CDMA), wideband CDMA (WCDMA), Universal Mobile Telecommunications System (UMTS), Time Division Multiple Access (TDMA), Long Term Evolution (LTE), ultra wideband (UWB), and the like, in addition to a Wifi module and a Wibro module.

A pose of the vehicle 1 may be changed depending on topography of an area and a road surface, and a pose of each of the cameras mounted on the vehicle 1 may be changed depending on topography of an area, a road surface, and external force. Due to the change in the pose of each camera, an error may occur when obtaining location information of an object.

Here, the location information of the object may include distance information related to a distance to the object and direction information of the object.

That is, a distance error between an actual distance between the object and the vehicle and a distance recognized through an image may occur depending on topography of an area, a road surface, and external force. A direction error of the object may also occur.

Accordingly, to accurately obtain the location information of the object through the plurality of cameras in a relationship between the vehicle 1 and the object, the pose of each of the cameras is required to be recognized. Alternatively, the pose of the vehicle including the plurality of cameras is required to be recognized.

A detailed example is described with reference to FIG. 3 and FIG. 4.

Figure 3:
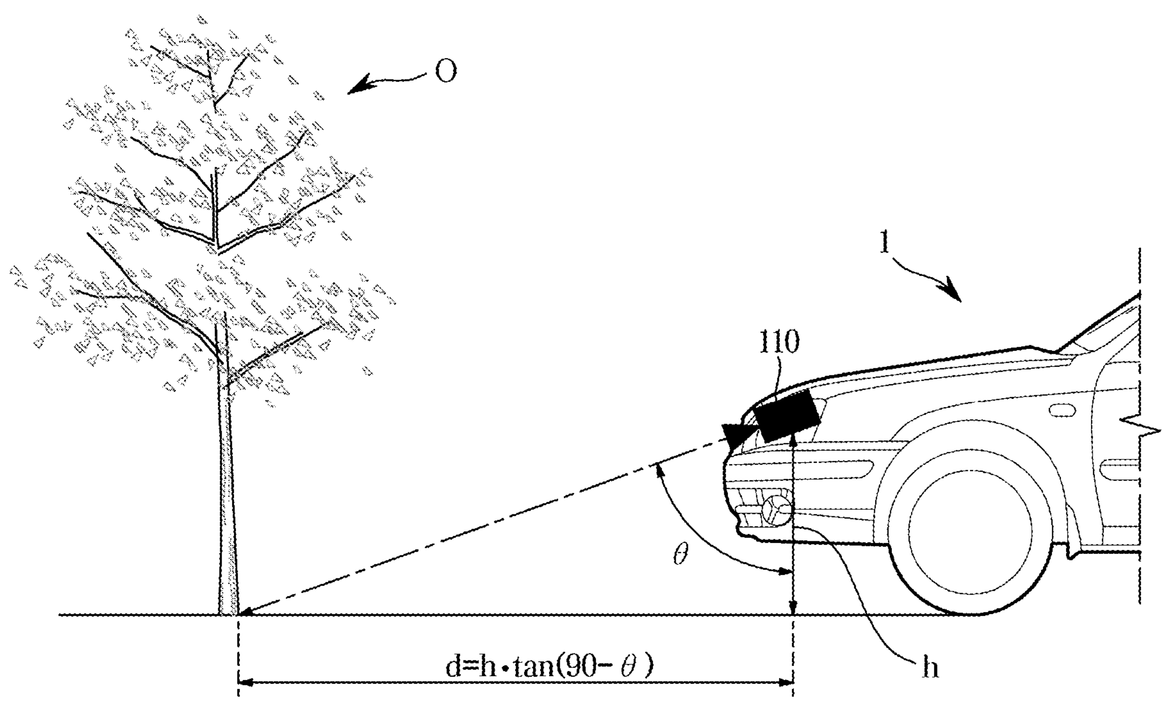
FIG. 3 and FIG. 4 are diagrams illustrating a distance error due to a change in pose of a vehicle according to an exemplary embodiment of the present disclosure.
Figure 4:
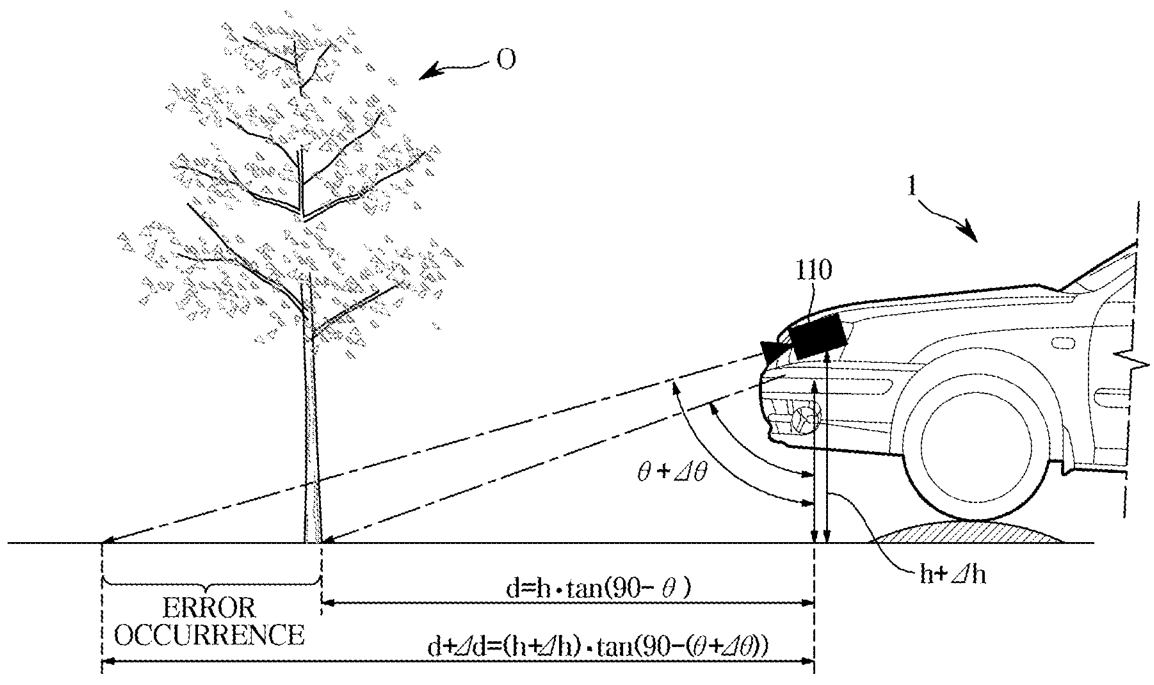

FIG. 3 and FIG. 4 are diagrams illustrating a distance error due to a change in pose of a vehicle according to an exemplary embodiment of the present disclosure. An occurrence of a distance error to an object due to a change in pose of a front camera among a plurality of cameras is referred to as an example.

The ADAS 200 recognizes an object O in an image of the front camera 110, and recognizes a distance to the object O through image processing.

As shown in FIG. 3, the ADAS 200 requires a pose of the front camera 110 relative to a road surface to recognize a horizontal distance between the vehicle 1 and the object O, wherein the x is the horizontal distance between the vehicle 1 and the object O and h is a vertical distance between the front camera 110 and the road surface and θ is an angle between the distance between the front camera 110 and the object O and the vertical distance h.

As shown in FIG. 4, when a pose of the vehicle 1 is changed by a topographical factor (e.g., a speed bump), a pose of the front camera 110 mounted on the vehicle 1 is also changed, and an image obtained by the front camera 110 whose pose is changed is changed. Accordingly, a distance error on a horizontal distance recognized through the changed image between the vehicle 1 and the object O occurs. In the present instance, no change occurs in relationship between the vehicle 1 and the front camera 110.

Therefore, the pose and the change in pose of the camera or the vehicle are required to be recognized to improve an accuracy of recognizing the distance to the object through the image.

The ADAS 200 may recognize the distance error to the object in the image based on the pose of the camera or the vehicle, and correct the horizontal distance between the vehicle 1 and the object O based on the recognized distance error. In the present instance, the corrected horizontal distance may have no error when compared to an actual horizontal distance.

That is, the horizontal distance recognized through the image may be equal to or similar to the actual horizontal distance to the object.

Hereinafter, a configuration of recognizing a pose of camera is described. A front camera among a plurality of cameras is referred to as an example.

The front camera 110 may be fixedly mounted on the vehicle 1, and thus a pose of the front camera 110 may be changed corresponding to a change in pose of the vehicle 1. That is, a changed pose of the vehicle may be recognized by recognizing a changed pose of the camera.

FIGS. 5 to 16A and 16B are diagrams illustrating a configuration of recognizing a pose of the front camera.

Recognition of a front camera pose may be performed by the processor 210 of the ADAS 200.

The processor 210 recognizes a trajectory of the front camera 110 and recognizes a relative pose of the front camera 110.

The processor 210 may obtain a weight of trajectory data about the trajectory of the front camera and a weight of relative pose data about the relative pose of the front camera, and recognize the pose of the front camera based on the trajectory data, the relative pose data, the weight of the trajectory data, and the weight of the relative pose data of the front camera, which is described in greater detail below.

The processor 210 receives a plurality of images obtained by the front camera 110. Here, a unit of an image may be a frame.

Here, the plurality of images may be obtained in chronological order by the front camera 110, and be consecutive images.

The processor 210 selects a first image obtained at a first point in time and a second image obtained at a second point in time among the plurality of images received. Here, the first point in time may be earlier than the second point in time. The first point in time may correspond to a time a preset time period earlier than the second point in time. The second image may be a consecutive image of the first image.

The processor 210 may recognize a stationary object and a moving object in the first image, and obtain a plurality of first feature points based on the stationary object in the first image.

The processor 210 may recognize a stationary object and a moving object in the second image, and obtain a plurality of second feature points based on the stationary object in the second image.

Here, the stationary object may be an inlier.

The processor 210 may identify a plurality of first and second feature points matching each other among the plurality of first feature points and the plurality of second feature points. Here, the plurality of first and second feature points matching each other may be feature points about a single portion of a single object in the first and second images.

Figure 5:
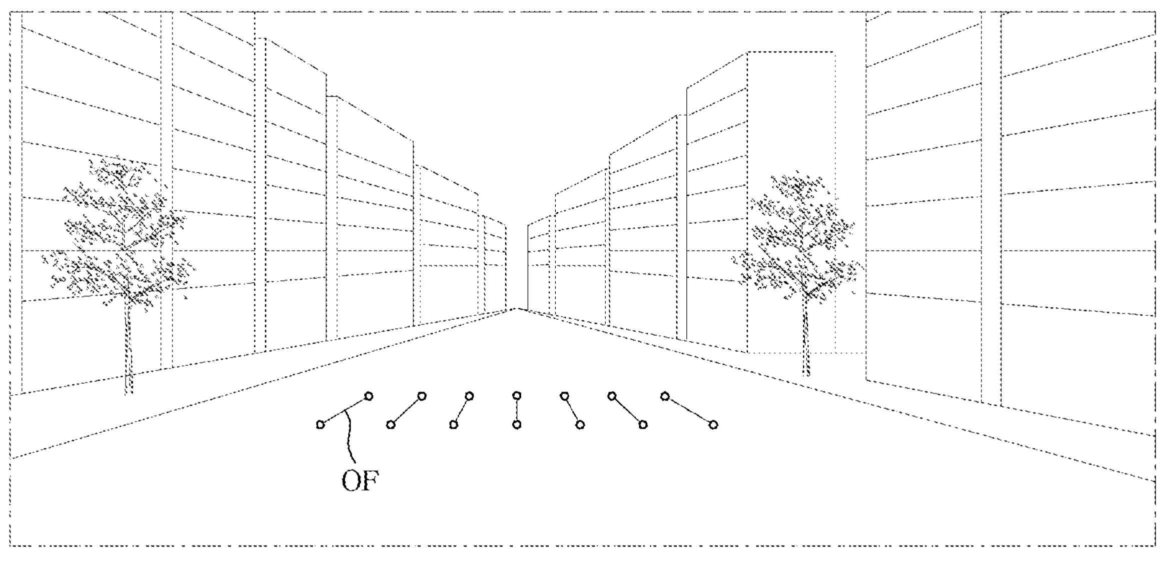
FIG. 5 illustrates an example of obtaining an optical flow by a vehicle according to an exemplary embodiment of the present disclosure.

As shown in FIG. 5, the processor 210 may identify the plurality of first and second feature points matching each other, and connect the identified first and second feature points, obtaining a plurality of optical flows (OF).

The processor 210 recognizes the change amount in pose of the front camera 110 based on the plurality of optical flows. The change amount in pose of the front camera 110 may include a movement distance and a rotation angle of the front camera 110.

The processor 210 may recognize an epipolar geometry (EG) based on relations of the plurality of optical flows, and recognize the change amount in pose of the front camera 110 by analyzing the recognized epipolar geometry.

Here, the epipolar geometry is a logic that aligns two or more images in parallel with a shooting direction, and is critical in photogrammetry and computer vision which manually and automatically extracts various information using stereoscopic images.

Also, by implementing epipolar geometry when automatic matching is performed, a search area may be minimized, and thus an efficiency and accuracy of matching may be improved.

The processor 210 may recognize a trajectory of the front camera 210 based on the change amount in pose of the front camera 110. The processor 210 may recognize a trajectory of the vehicle 1 based on the trajectory of the front camera 210. Here, the trajectory of the vehicle 1 may be identical to the trajectory of the front camera 210.

The processor 210 may recognize stationary objects in the first image, and obtain a plurality of third feature points based on a road surface area of the stationary objects in the first image.

The processor 210 may recognize stationary objects in the second image, and obtain a plurality of fourth feature points based on a road surface area of the stationary objects in the second image.

The road surface area in the first and second images may be an inlier.

The plurality of third feature points may be a portion of the plurality of first feature points and the plurality of fourth feature points may be a portion of the plurality of second feature points.

The processor 210 identifies a plurality of third and fourth feature points matching each other, and generates a plurality of straight lines by connecting and extending the plurality of third and fourth feature points matching each other. Here, the plurality of straight lines may be a plurality of optical flow vectors.

Figure 6:
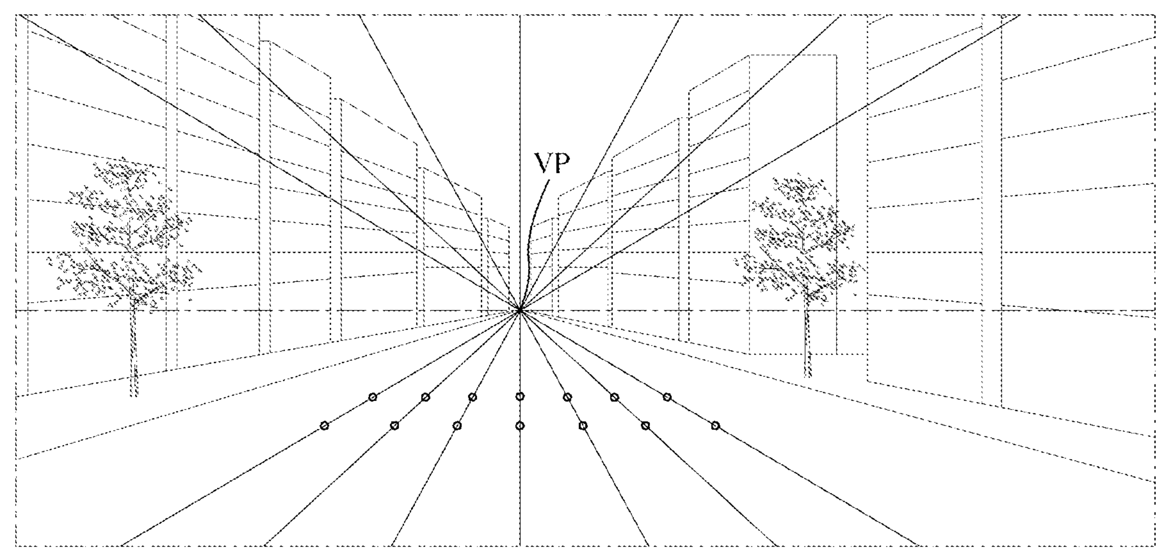
FIG. 6 illustrates an example of obtaining a vanishing point by a vehicle according to an exemplary embodiment of the present disclosure.

As shown in FIG. 6, the processor 210 may obtain a plurality of cross points where the plurality of straight lines cross, obtain a vanishing point VP based on the obtained plurality of cross points, and recognize a relative pose of the front camera 110 based on location information of the obtained vanishing point.

The processor 210 may recognize a point where the plurality of obtained cross points converge, and obtain the recognized point as the vanishing point.

The processor 210 may obtain, as X-Y coordinates, positions of the cross points where the plurality of straight lines cross, and recognize a point where the cross points converge on the X-Y coordinates.

The processor 210 may also identify location information of the plurality of cross points, identify a cross point with the most overlapping location information, and obtain the identified cross point as the vanishing point.

The cross points where the plurality of straight lines cross may be vanishing point candidates.

Any one of the cross points where the plurality of straight lines cross may be the vanishing point.

When a road surface is even, a density of the vanishing point candidates may increase, and when a road surface is not even, a density of the vanishing point candidates may decrease.

The decrease in density of the vanishing point candidates may include an increase in dispersion of the vanishing point candidates.

When a road surface is even, a position of the recognized vanishing point may converge to an ideal position.

The even road surface refers to a flat road surface without a speed bump or a pothole.

The uneven road surface refers to an unpaved road or a road with a speed bump or a pothole.

Figure 7:
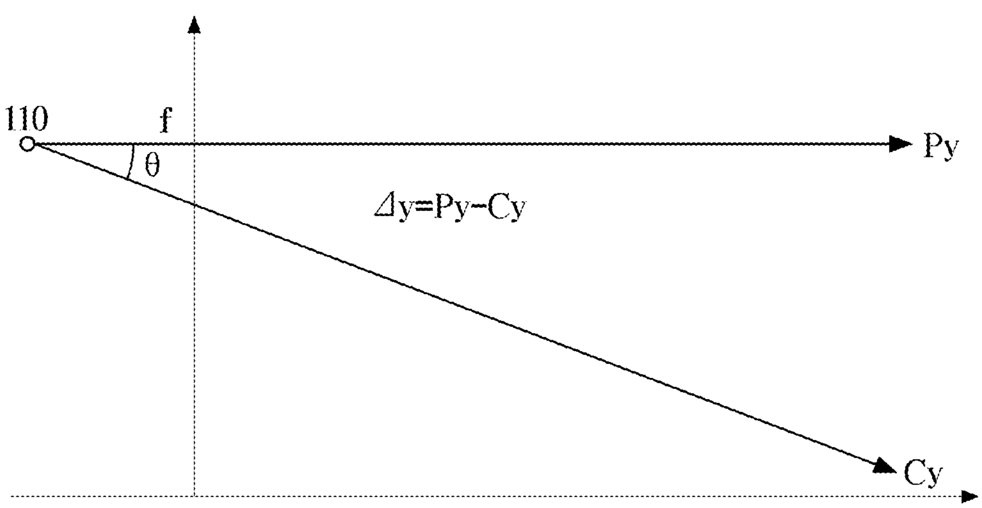
FIG. 7 illustrates an example for obtaining relative pose data of a camera provided in a vehicle according to an exemplary embodiment of the present disclosure.

As shown in FIG. 7, the processor 210 may identify location information Cy of a central point to which the front camera 110 is directed among location information of a road surface, identify location information Py of a vanishing point, obtain a height Δy from the road surface to the vanishing point based on the location information of the central point and the location information of the vanishing point, and recognize an angle θ of the front camera 110 based on the obtained height and a focal distance f of the front camera 110. Here, the angle θ of the front camera 110 is a tilt angle of the front camera, and corresponds to relative pose data of the front camera.

$$\text{Height } \Delta y = Py - Cy$$

$$\text{Angle } \theta = \text{atan}(\Delta y / f)$$

Figure 8A:
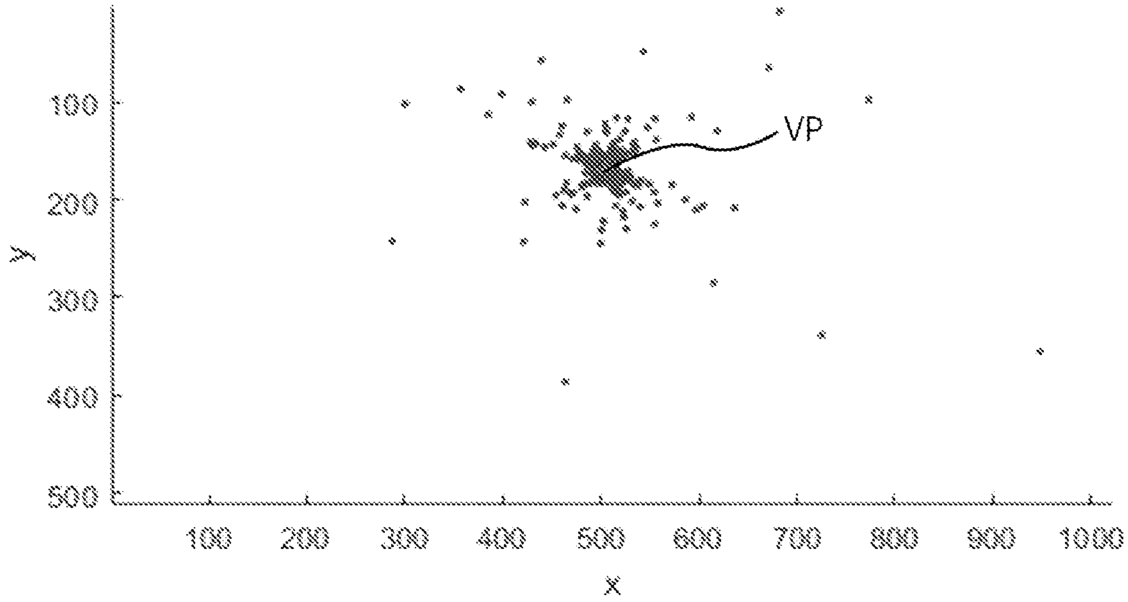
FIG. 8A is X-Y coordinates showing positions of a plurality of cross points when driving on a flat road.

As shown in FIG. 8A, the processor 210 may obtain positions of the plurality of cross points as X-Y coordinates. Here, an X-axis corresponds to a horizontal value of the image, and an Y-axis corresponds to a vertical value of the image.

Figure 8B:
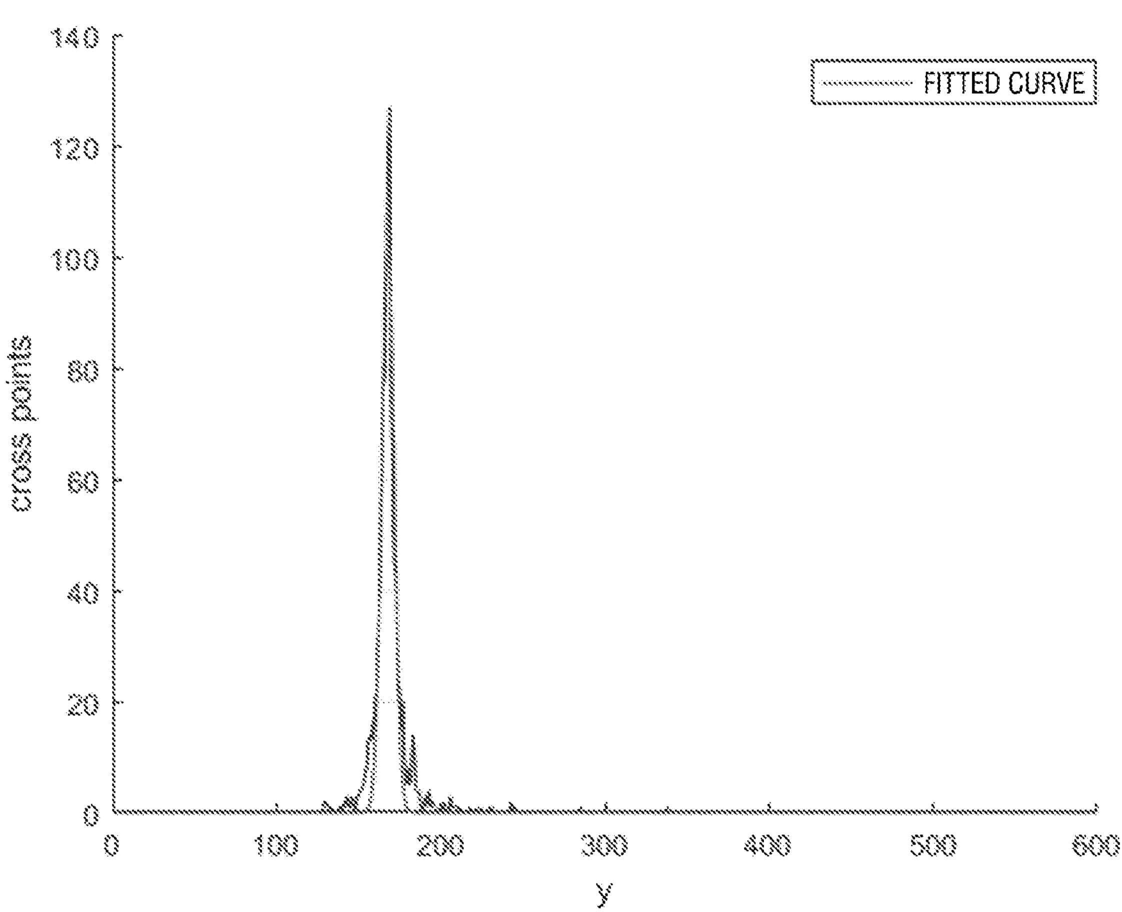
FIG. 8B is a Gaussian graph and accumulated coordinates of a plurality of cross points shown in FIG. 8A.

As shown in FIG. 8B, the processor 210 may obtain an accumulated graph in which the positions of the plurality of cross points are accumulated and displayed, and obtain a Gaussian graph through Gaussian fitting for the plurality of cross points.

Figure 9:
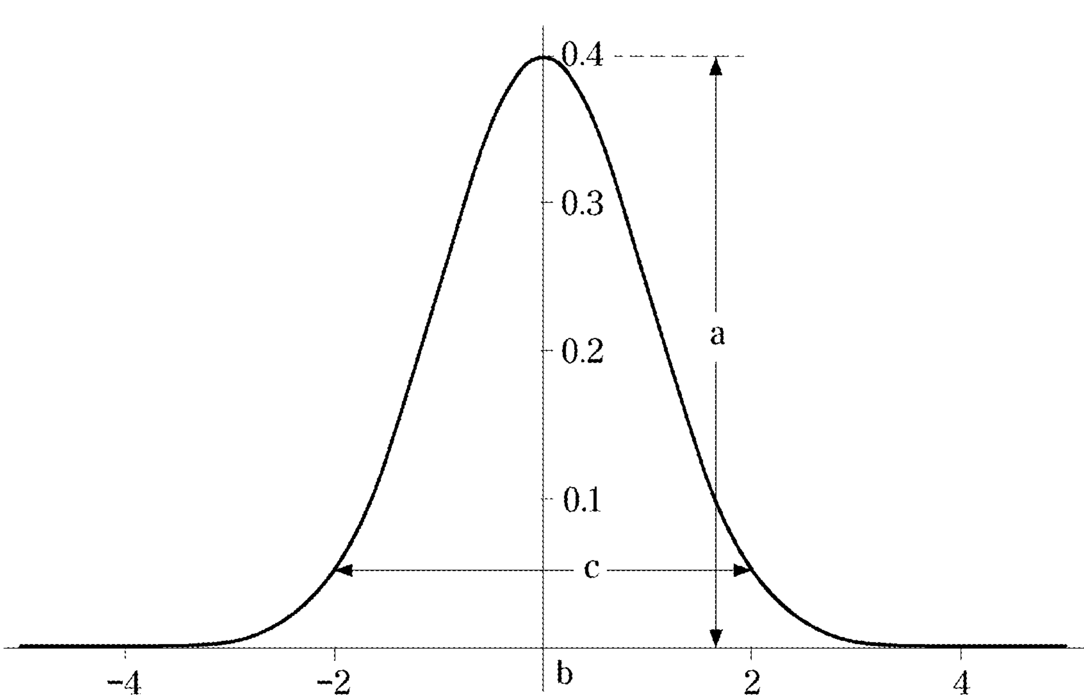
FIG. 9 illustrates an example of a Gaussian graph obtained by a vehicle according to an exemplary embodiment of the present disclosure.

As shown in FIG. 9, the processor 210 may obtain Gaussian coefficients a, b, and c by use of a Gaussian function for the plurality of cross points.

Gaussian function $Y=a*\exp(-((x-b)/c)^2)$

Here, the Gaussian coefficient a is a height of the Gaussian function. The larger the Gaussian coefficient a, the more cross points are concentrated at one position of the coordinates.

The Gaussian coefficient b is a central point of the Gaussian function, and indicates a y-coordinate value of the vanishing point.

The Gaussian coefficient c is a width of the Gaussian function. The smaller the Gaussian coefficient c, the more cross points are concentrated at a single position of the coordinates.

The processor 210 may obtain a reliability based on the Gaussian coefficients a and c, and obtain a weight of the relative pose data based on the obtained reliability.

The processor 210 may also obtain a weight of trajectory data based on the weight of the relative pose data.

To obtain a reliability, the processor 210 may obtain a reliability determination value by dividing the width c by the height a of the Gaussian graph.

Reliability determination value$=c/a$

The Gaussian coefficients and reliability determination value of the Gaussian graph shown in FIG. 8B are as follows.

$a=103.8476, b=167.7727, c=5.3377, c/a=0.0514$

Figure 10:
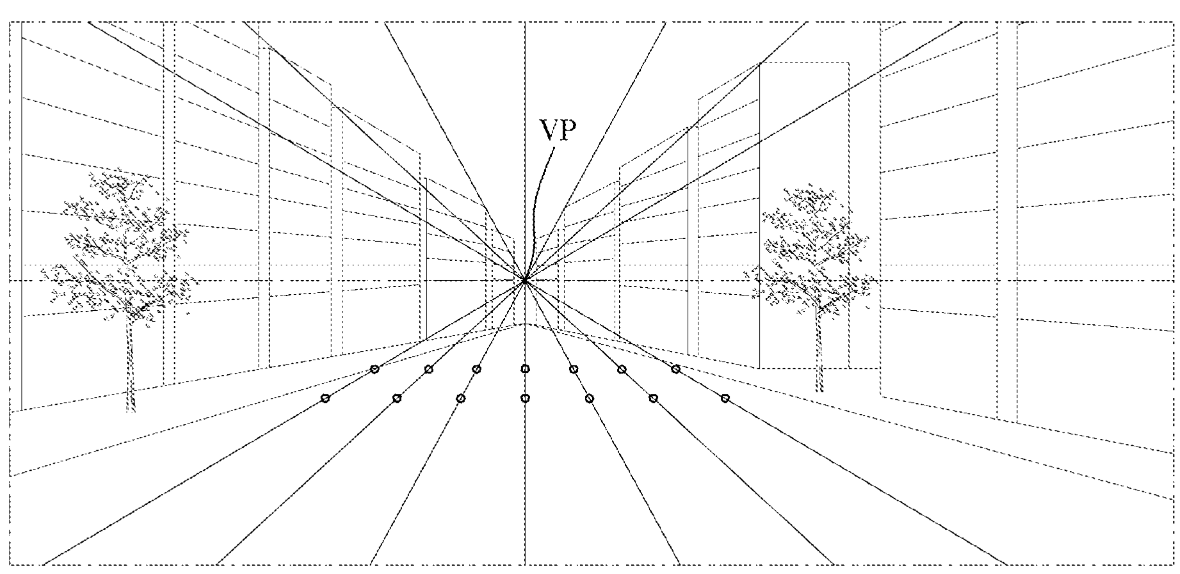
FIG. 10 illustrates an example of cross points in an image obtained when a vehicle according to an exemplary embodiment approaches a speed bump.

FIG. 10 illustrates an example of cross points in an image obtained when a vehicle according to an exemplary embodiment approaches a speed bump.

The processor 210 may be configured to generate a plurality of straight lines by connecting and extending a plurality of third and fourth feature points matching each other in first and second images obtained when a vehicle approaches a speed bump, and then obtain a plurality of cross points where the plurality of straight lines cross. Here, the first and second images are consecutive images.

Figure 11A:
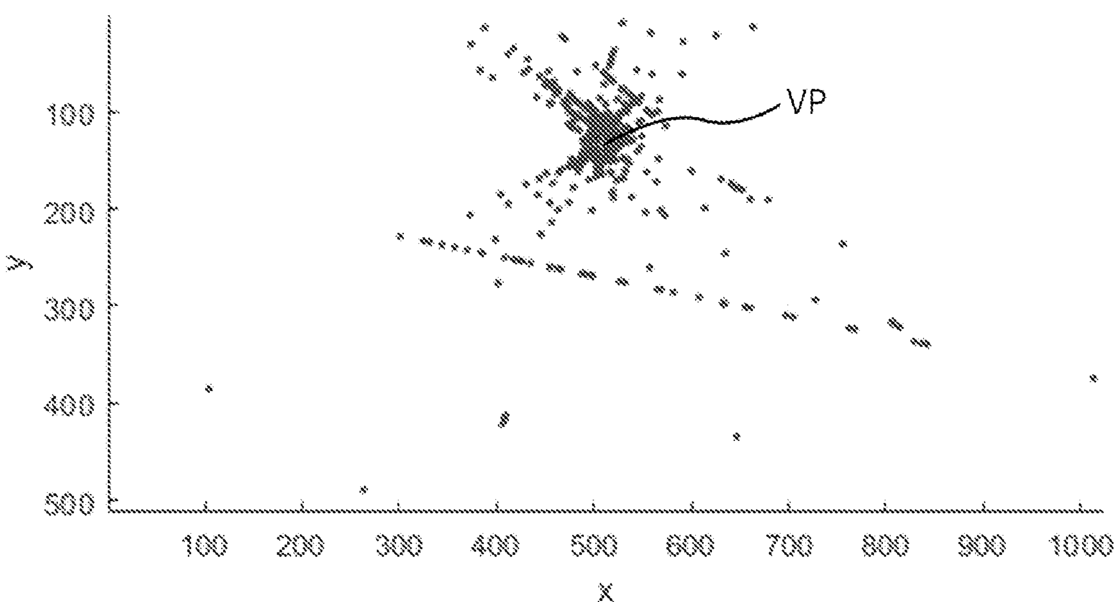
FIG. 11A is X-Y coordinates showing positions of a plurality of cross points obtained in FIG. 10.
Figure 11B:
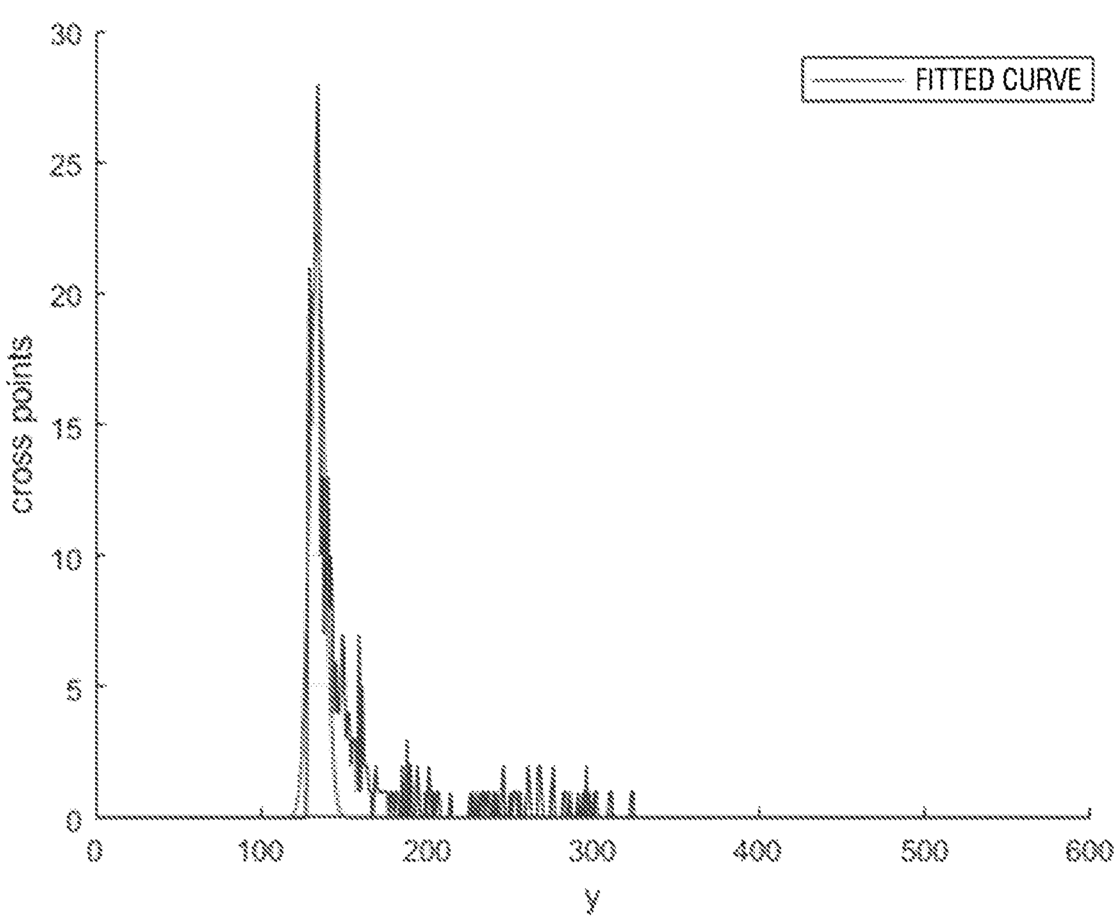
FIG. 11B is a Gaussian graph and accumulated coordinates of a plurality of cross points shown in FIG. 11A.

FIG. 11A is X-Y coordinates showing positions of the plurality of cross points, and FIG. 11B is a Gaussian graph and accumulated coordinates of the plurality of cross points shown in FIG. 11A.

Gaussian coefficients and a reliability determination value of the Gaussian graph shown in FIG. 11B are as follows.

$a=22.2039, b=133.7612, c=6.4232, c/a=0.2898$

Figure 12:
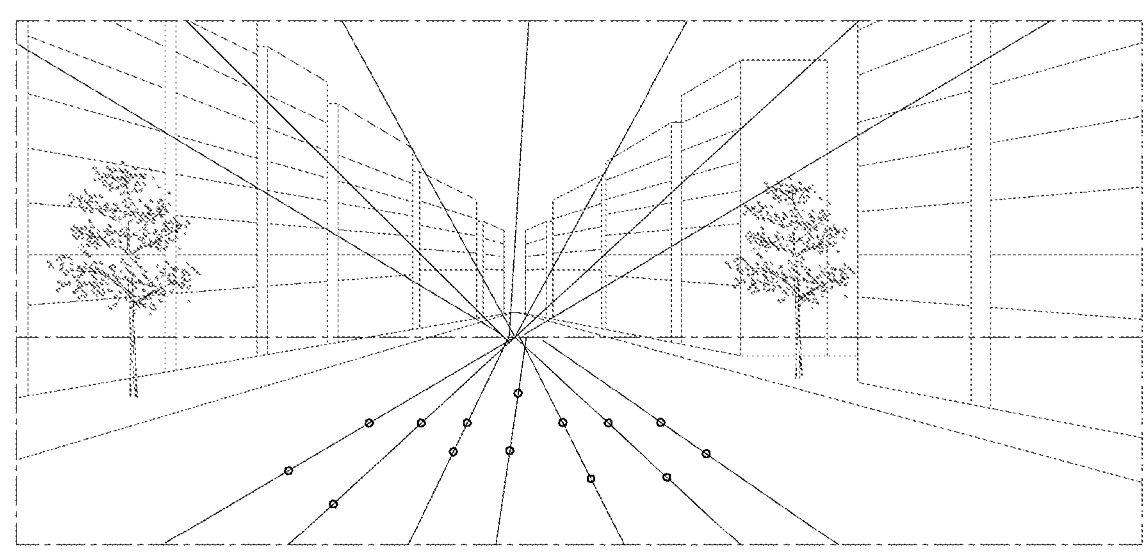
FIG. 12 illustrates an example of cross points in an image obtained when a vehicle according to an exemplary embodiment of the present disclosure is moving away from a speed bump.

FIG. 12 illustrates an example of cross points in an image obtained when a front panel of the vehicle is moving away from a speed bump.

The processor 210 may be configured to generate a plurality of straight lines by connecting and extending a plurality of third and fourth feature points matching each other in first and second images obtained when a vehicle is moving away from a speed bump, and then obtain a plurality of cross points where the plurality of straight lines cross. Here, the first and second images are consecutive images.

Figure 13A:
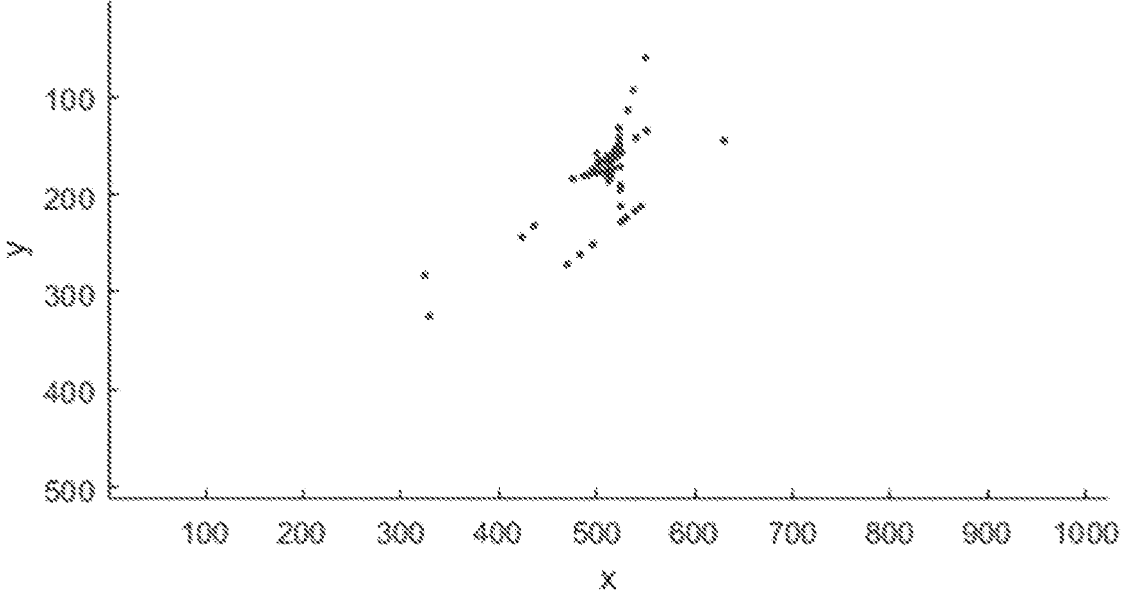
FIG. 13A is X-Y coordinates showing positions of a plurality of cross points obtained in FIG. 12.
Figure 13B:
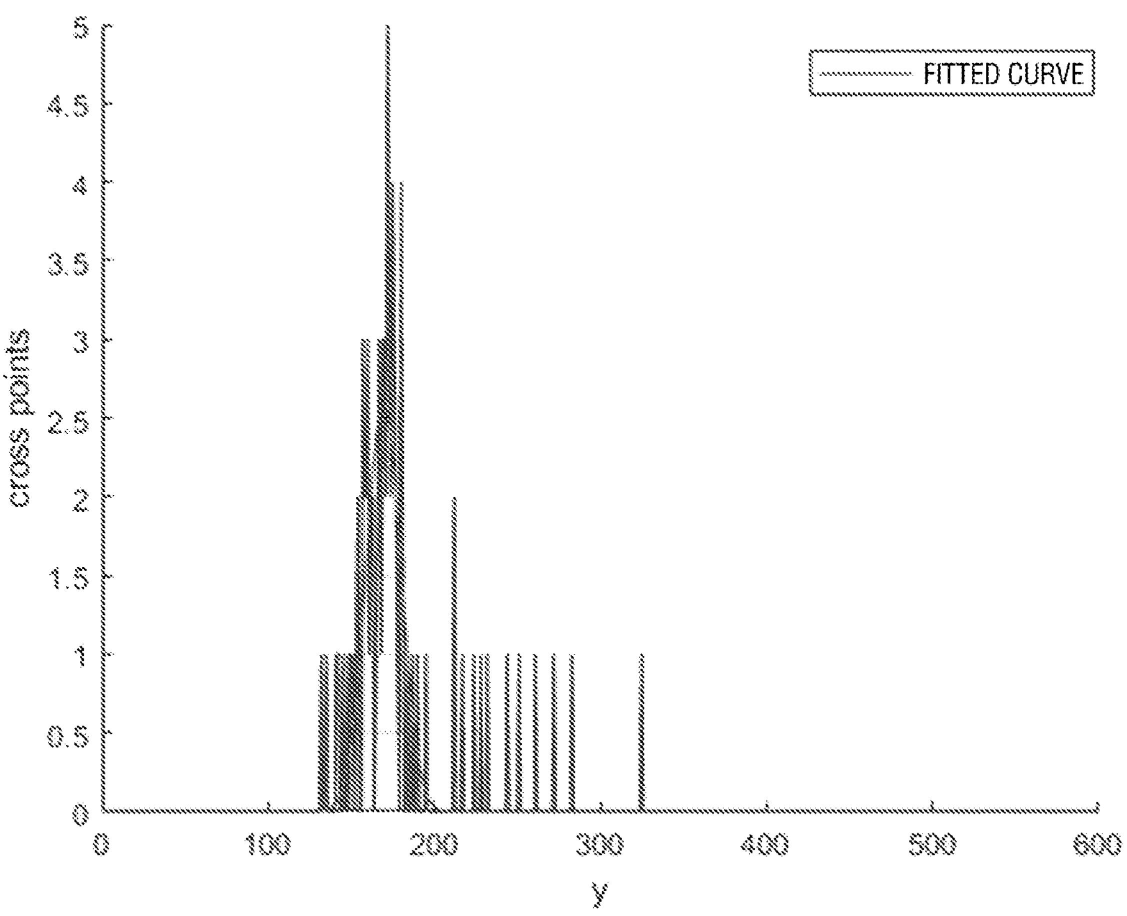
FIG. 13B is a Gaussian graph and accumulated coordinates of a plurality of cross points shown in FIG. 13A.

FIG. 13A is X-Y coordinates showing positions of the plurality of cross points, and FIG. 13B is a Gaussian graph and accumulated coordinates of a plurality of cross points shown in FIG. 13A.

Gaussian coefficients and a reliability determination value of the Gaussian graph shown in FIG. 13B are as follows.

$a=2.6061, b=169.5194, c=14.6106, c/a=5.6062$

Figure 14:
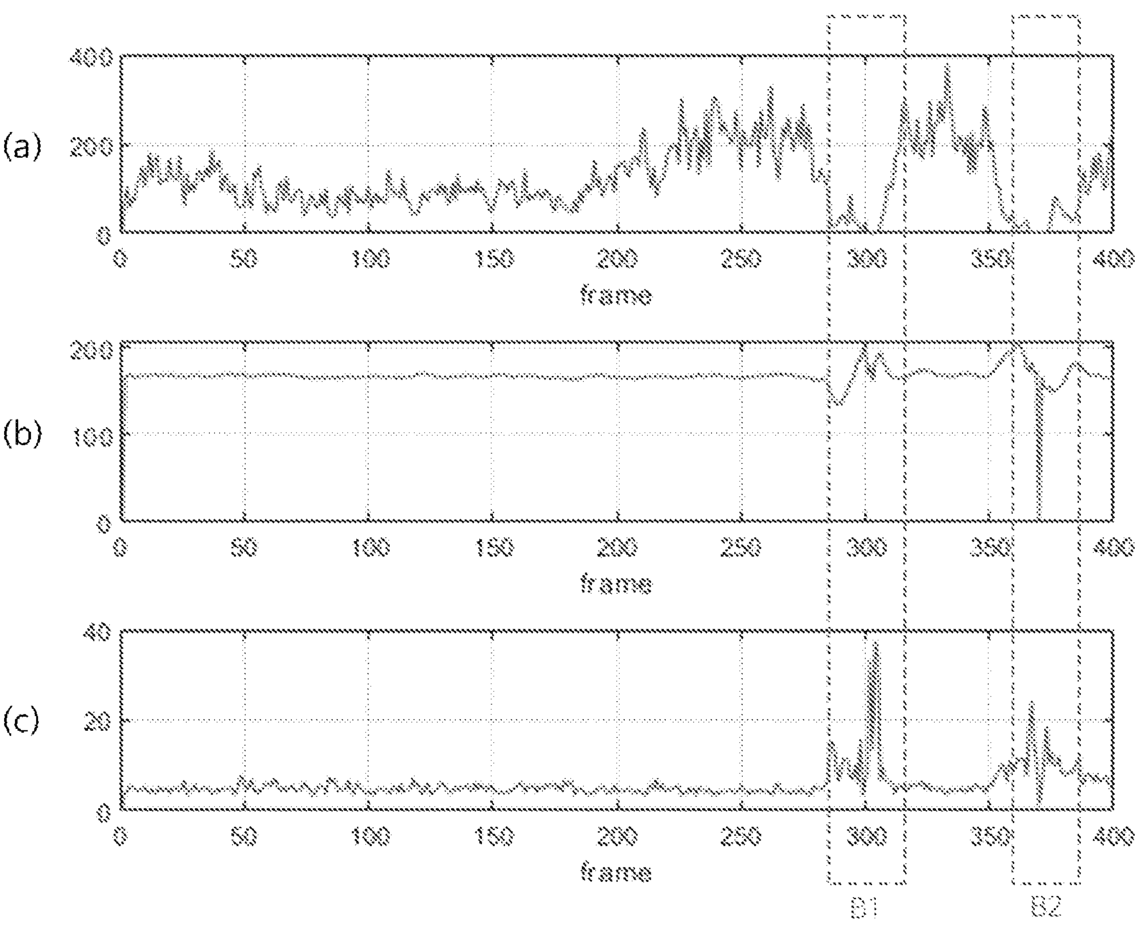
FIG. 14 are graphs of Gaussian coefficients a, b, and c obtained in a section B1 where a vehicle according to an exemplary embodiment approaches a speed bump and a section B2 where the vehicle is moving away from the speed bump after driving on a flat road.

FIG. 14 are graphs of Gaussian coefficients a, b, and c obtained in a section B1 where a vehicle approaches a speed bump and a section B2 where the vehicle is moving away from the speed bump after driving on a flat road.

Figure 15A:
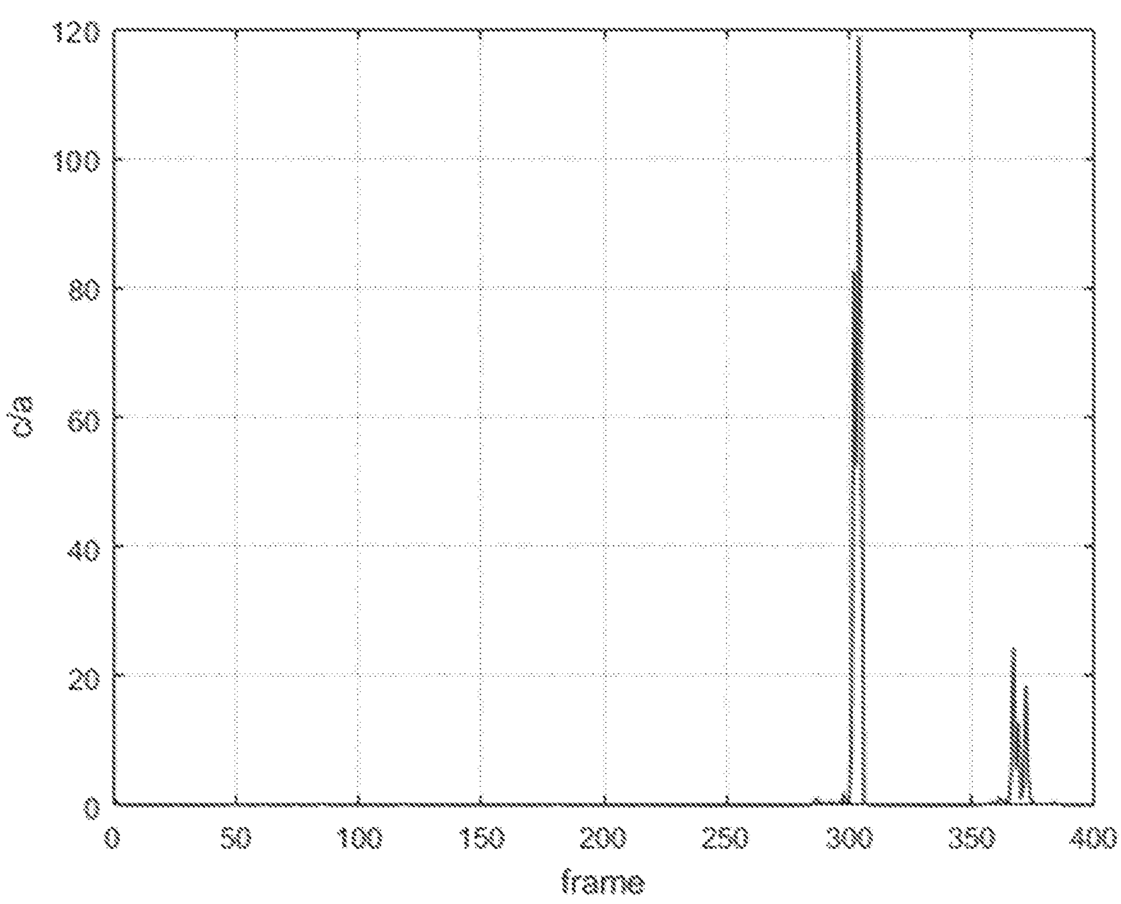
FIG. 15A is a graph of reliability determination values (c/a)
Figure 15B:
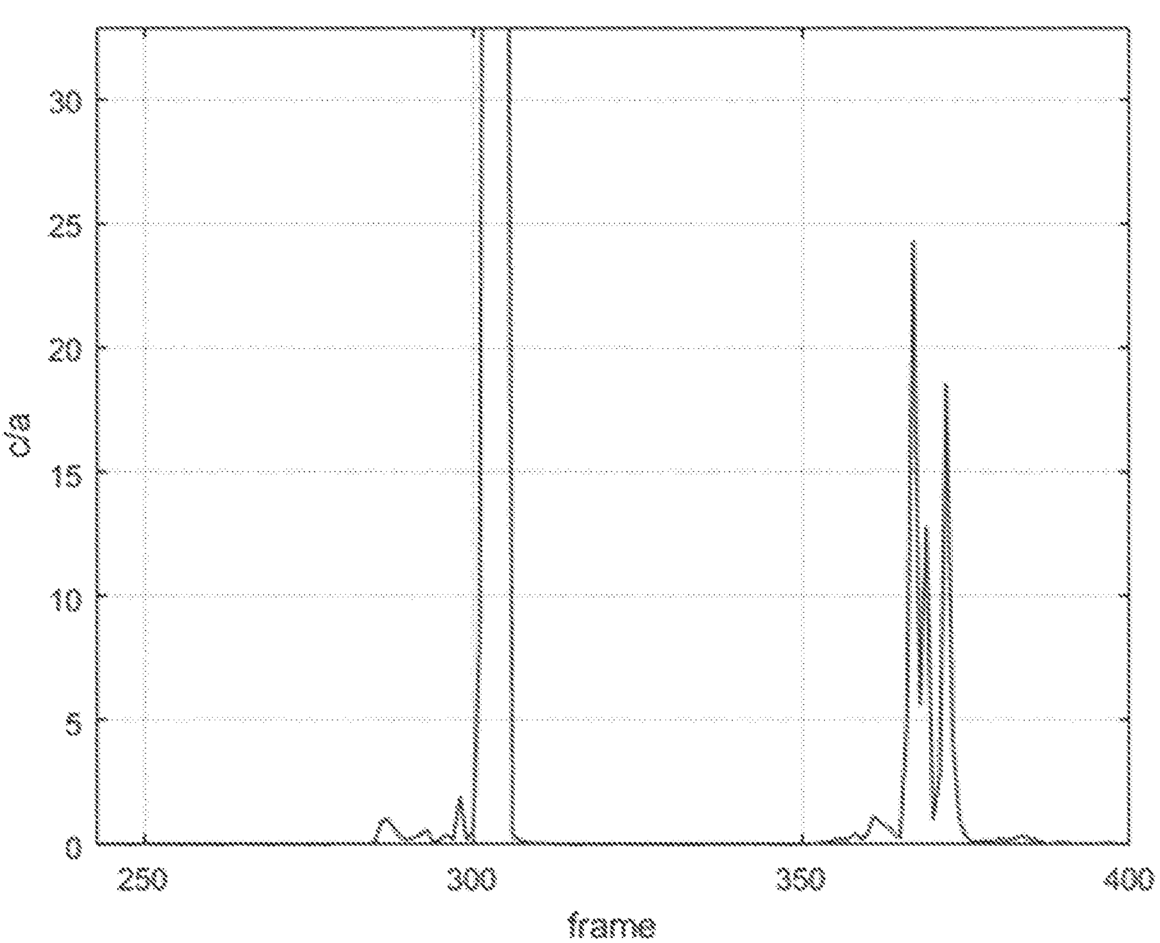
FIG. 15B is an enlarged graph of FIG. 15A.

FIG. 15A is a graph of reliability determination values (c/a), and FIG. 15B is an enlarged graph of FIG. 15A.

As shown in FIGS. 14, 15A and 15B, it may be identified that when a road surface is not even, a Gaussian coefficient a decreases, and as a Gaussian coefficient c increases, a reliability determination value increases.

The processor 210 may be configured to determine that a reliability is high, as the reliability determination value is closer to 0, and also determine that a reliability is low, as the reliability determination value is closer to 1.

In the exemplary embodiment of the present disclosure, a section with a high reliability of camera pose data and a section with a low reliability of camera pose data may be identified without an inertia measurement unit (IMU).

The processor 210 may be configured to determine that a density of vanishing point candidates is high, as the reliability determination value is closer to 0, and determine that a density of vanishing point candidates is low, as the reliability determination value is closer to 1.

Here, the reliability is a reliability of vanishing point candidates configured for recognizing pose data for a relative pose of a camera.

That is, a high reliability determination value refers to a high reliability of the vanishing point candidates, a road surface with little curvature or without curvature, and a high density of vanishing point candidates. By contrast, a low reliability determination value refers to a low reliability of the vanishing point candidates, a road surface with many curvatures, and a low density of vanishing point candidates.

When the reliability determination value is equal to or similar to 0, the processor 210 may increase a weight of the relative pose data than a weight of the trajectory data, and when the reliability determination value is equal to or similar to 1, increase the weight of the trajectory data than the weight of the relative pose data.

That is, as the reliability determination value is closer to 0, the processor 210 may set the weight of the relative pose data to be higher, and as the reliability determination value is closer to 1, the processor 210 may set the weight of the trajectory data to be higher.

The processor 210 may identify a weight of the relative pose data corresponding to the reliability determination value, and obtain a weight of the trajectory data based on the identified weight of the relative pose data.

Here, the weight of the relative pose data corresponding to the reliability determination value may be stored in the memory 220.

The processor 210 may identify a density corresponding to the reliability determination value, and when a density of vanishing point candidates is equal to or greater than a reference density, set the weight of the relative pose data to be higher, and when a density of vanishing point candidates is less than the reference density, set the weight of the trajectory data to be higher.

Here, the density corresponding to the reliability determination value may be stored in the memory 220. The reference density may be stored in the memory 220.

The processor 210 may identify a weight of the relative pose data corresponding to the density of vanishing point candidates, and obtain a weight of the trajectory data based on the identified weight of the relative pose data.

Here, the weight of the relative pose data corresponding to the density of vanishing point candidates may be stored in the memory 220.

An example of applying weights of relative pose data and trajectory data is described.

The processor 210 may recognize a pose of the front camera by use of a weighted sum. Here, the pose of the front camera may be a front camera pose changed between a point in time that a first image is obtained and a point in time that a second image is obtained.

$$\text{Weighted sum}=(1-\alpha)A+\alpha B, 0\leq\alpha\leq 1$$

Here, A is trajectory data, B is relative pose data, and $\alpha$ is a weight of the relative pose data.

The processor 210 may recognize the pose of the front camera by use of a Kalman filter modeled on the weighted sum.

The processor 210 may use a difference in relative pose between the first and second images, as an input of the Kalman filter.

The difference in relative pose between the first and second images may be a front camera's angle changed between the point in time that the first image is obtained and the point in time that the second image is obtained.

The processor 210 corrects an image obtained by the front camera, based on the changed pose of the front camera.

The corrected image may be the second image.

The processor 210 may be configured to generate a top view image using the corrected image, and control the display 160 to display the generated top view image.

Figure 16A:
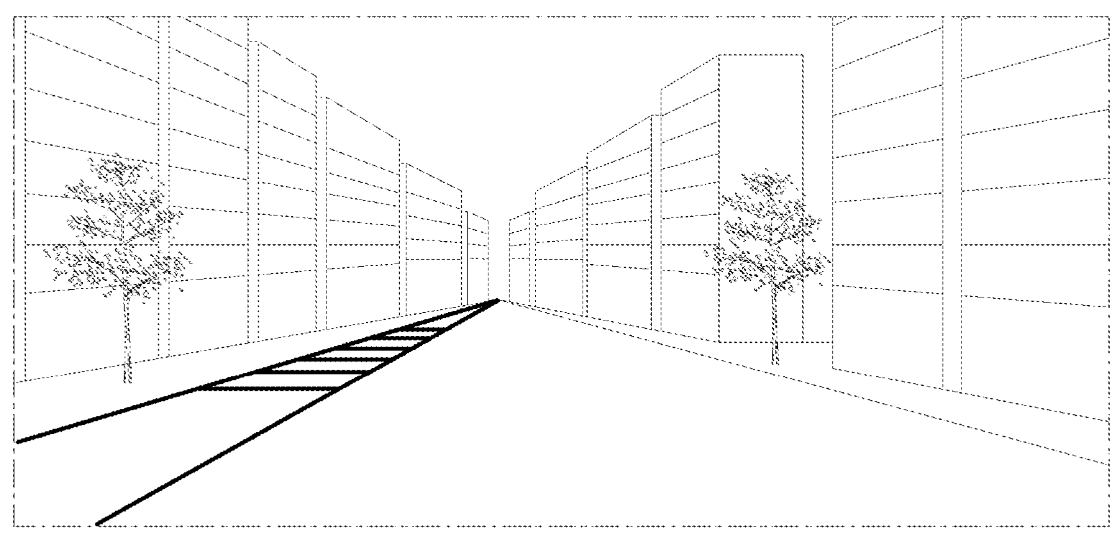
FIG. 16A is an original image obtained by a front camera.
Figure 16B:
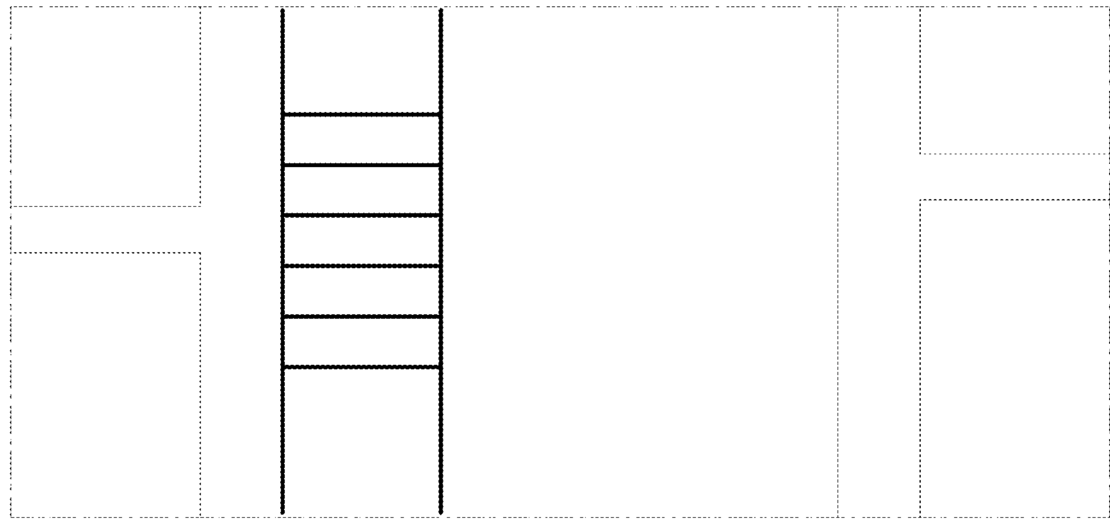
FIG. 16B is a top view image obtained by correcting a distance to an object in the original image obtained by the front camera.

FIG. 16A is an original image obtained by a front camera, and FIG. 16B is a top view image obtained by correcting a distance to an object in the original image obtained by the front camera.

The processor 210 may accurately recognize a pose of the vehicle and a pose of the camera based on a distance to an object in an image corrected based on a distance error, and thus an accuracy of a top view image may be improved.

The processor 210 may also obtain the distance to the object based on the top view image. When in an autonomous driving mode, the processor 210 may control autonomous driving based on the recognized pose of the vehicle. When controlling the autonomous driving, the processor 210 may control braking and steering.

When in a collision warning mode, the processor 210 may correct the distance to the object based on the recognized pose of the vehicle, determine a likelihood of collision to the object based on the corrected distance, and when it is determined that the likelihood of collision to the object exists, control the display or speaker to output warning information.

The processor 210 may be provided as separate processors like a camera trajectory recognition processor, a camera relative pose recognition processor, a weight acquisition processor, and a data fusion processor.

The processor 210 may be a processor provided in the vehicle 1.

The processor 210 may be a processor for image-processing the images of a plurality of cameras.

At least one constituent component may be added or omitted corresponding to the performance of the constituent components of the ADAS 200 and the vehicle 1 illustrated in FIG. 2. Also, it will be easily understood by those skilled in the art that mutual positions of the constituent components may be modified corresponding to the performance or structure of the system.

Meanwhile, each of the constituent components shown in FIG. 2 refers to a software, and/or a hardware component such as a field-programmable gate array (FPGA) or an application-specific integrated circuit (ASIC).

As is apparent from the above, according to the exemplary embodiments of the present disclosure, an accuracy of recognizing a camera pose or a vehicle pose may be improved, and thus an accuracy of recognizing a distance to an object may be improved as well.

According to the exemplary embodiments of the present disclosure, a relative pose of a camera may be recognized based on a vanishing point and a trajectory, facilitating a camera pose initialization function for camera pose recognition without using a sensor such as an inertia measurement unit (IMU). Thus, an accuracy of distance error compensation may be improved.

Meanwhile, embodiments may be stored in a form of a recording medium storing computer-executable instructions. The instructions may be stored in a form of a program code, and when executed by a processor, the instructions may perform operations of the disclosed exemplary embodiments of the present disclosure. The recording medium may be implemented as a computer-readable recording medium.

The computer-readable recording medium includes all kinds of recording media in which instructions which may be decoded by a computer are stored of, for example, a read only memory (ROM), random access memory (RAM), magnetic tapes, magnetic disks, flash memories, optical recording medium, and the like.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An advanced driver assistance system (ADAS), comprising:

a communicator configured to communicate with a camera; and a processor operatively connected to the communicator and configured to:

receive a first image and a second image obtained by the camera, obtain a plurality of first feature points based on the received first image, obtain a plurality of second feature points based on the received second image, obtain a plurality of first and second feature points matching each other among the plurality of first feature points and the plurality of second feature points, obtain an optical flow and a vanishing point based on the plurality of first and second feature points matching each other, recognize a pose of the camera based on the optical flow and the vanishing point, and correct a distance to an object in the second image based on the recognized pose of the camera, wherein the processor is further configured to:

obtain relative pose data of the camera based on location information of the obtained vanishing point, obtain a trajectory data of the camera based on the obtained optical flow, obtain a plurality of cross points where a plurality of lines cross, the plurality of lines being defined by the plurality of first and second feature points that match each other, identify a density of the plurality of cross points, obtain a weight of the relative pose data of the camera and a weight of the trajectory data of the camera based on the identified density, and recognize the pose of the camera based on the obtained weight of the relative pose data of the camera and the obtained weight of the trajectory data of the camera.

2. The ADAS of claim 1, wherein the second image is obtained consecutively after the first image is obtained.

3. The ADAS of claim 1, wherein the processor is further configured to:

generate the plurality of lines by connecting and extending the plurality of first and second feature points matching each other, obtain the plurality of cross points where the plurality of lines cross, and obtain a point where the plurality of cross points converge, as the vanishing point.

4. An advanced driver assistance system (ADAS), comprising:

a communicator configured to communicate with a camera; and a processor operatively connected to the communicator and configured to:

receive a first image and a second image obtained by the camera, obtain a plurality of first feature points based on the received first image, obtain a plurality of second feature points based on the received second image, obtain a plurality of first and second feature points matching each other among the plurality of first feature points and the plurality of second feature points, obtain an optical flow and a vanishing point based on the plurality of first and second feature points matching each other, recognize a pose of the camera based on the optical flow and the vanishing point, and correct a distance to an object in the second image based on the recognized pose of the camera, wherein the processor is further configured to:

obtain relative pose data of the camera based on location information of the obtained vanishing point, obtain a trajectory data of the camera based on the obtained optical flow, obtain a plurality of cross points where a plurality of lines cross, the plurality of lines defined by the plurality of first and second feature points that match each other, identify a density of the plurality of cross points, perform a Gaussian fitting for the plurality of cross points, obtain a Gaussian coefficient corresponding to the Gaussian fitting, obtain a reliability determination value based on the obtained Gaussian coefficient, obtain a weight of the relative pose data based on the obtained reliability determination value, and obtain a weight of the trajectory data based on the obtained weight of the relative pose data.

5. The ADAS of claim 4, wherein the Gaussian coefficient includes a height and a width of a Gaussian graph corresponding to the Gaussian fitting, and the reliability determination value is obtained by dividing the width by the height.

6. The ADAS of claim 5, wherein the processor is further configured to:

set a reliability of the relative pose data to be higher than a reliability of the trajectory data, based on the reliability determination value being equal to or similar to 0, and set the reliability of the trajectory data to be higher than the reliability of the relative pose data, based on the reliability determination value being equal to or similar to 1.

7. A vehicle, comprising:

a vehicle body;

a camera provided on the vehicle body; and a processor configured to recognize an object and a distance to the object based on images obtained by the camera, wherein the processor is configured to:

obtain a plurality of first feature points based on a first image among the images, obtain a plurality of second feature points based on a second image among the images, obtain a plurality of first and second feature points matching each other among the plurality of first feature points and the plurality of second feature points, obtain a plurality of optical flows and a vanishing point based on the plurality of first and second feature points matching each other, recognize a pose of the camera based on the plurality of optical flows and the vanishing point, obtain a distance error to an object in the second image based on the recognized pose of the camera, and correct a distance to the object based on the obtained distance error, wherein the processor is further configured to:

obtain relative pose data of the camera based on location information of the obtained vanishing point, obtain a trajectory data of the camera based on the obtained optical flows, obtain a plurality of cross points where a plurality of lines cross, the plurality of lines being defined by the plurality of first and second feature points that match each other, identify a density of the plurality of cross points, obtain a weight of the relative pose data of the camera and a weight of the trajectory data of the camera based on the identified density, and recognize the pose of the camera based on the obtained weight of the relative pose data of the camera and the obtained weight of the trajectory data of the camera.

8. The vehicle of claim 7, further including:

a display, wherein the processor is further configured to generate a top view by use of the second image obtained by correcting the distance to the object, and control the display to display the generated top view.

9. The vehicle of claim 7, wherein the processor is further configured to control an autonomous driving and a collision warning based on the second image obtained by correcting the distance to the object.

10. The vehicle of claim 7, wherein the processor is configured to:

generate the plurality of lines by connecting and extending the plurality of first and second feature points matching each other, obtain the plurality of cross points where the plurality of lines cross, and obtain a point where the plurality of cross points converge, as the vanishing point.

11. The vehicle of claim 7, wherein, in the identifying the density, the processor is configured to:

perform a Gaussian fitting for the plurality of cross points, obtain a Gaussian coefficient corresponding to the Gaussian fitting, obtain a reliability determination value based on the obtained Gaussian coefficient, and identify the density corresponding to the reliability determination value.

12. The vehicle of claim 11, wherein the processor is configured to:

obtain the weight of the relative pose data based on the obtained reliability determination value, and obtain a weight of the trajectory data based on the obtained weight of the relative pose data.

13. The vehicle of claim 12, wherein the Gaussian coefficient includes a height and a width of a Gaussian graph corresponding to the Gaussian fitting, and wherein the reliability determination value is obtained by dividing the width by the height.

14. The vehicle of claim 12, wherein the processor is configured to:

set a reliability of the relative pose data to be higher than a reliability of the trajectory data, based on the reliability determination value being equal to or similar to 0, and set the reliability of the trajectory data to be higher than the reliability of the relative pose data, based on the reliability determination value being equal to or similar to 1.

* * * * *